March 4, 1969 AKIRA USUI ET AL 3,431,160

METHOD OF MAKING A WEAR-RESISTANT SLIDING-SURFACE STRUCTURE

Filed Sept. 4, 1964

Akira Usui
Michiharu Kurokochi
Shigeo Sugiyama
INVENTOR.

BY George B. Aujerolle
Attorney

United States Patent Office 3,431,160
Patented Mar. 4, 1969

3,431,160
METHOD OF MAKING A WEAR-RESISTANT SLIDING-SURFACE STRUCTURE
Akira Usui and Michiharu Kurokochi, Numazu-shi, and Shigeo Sugiyama, Sunto-gun, Japan, assignors to Usui Kokusai Sangyo Kabushiki Kaisha, Shizuoka-ken, Japan, a joint-stock company of Japan
Filed Sept. 4, 1964, Ser. No. 394,477
Claims priority, application Japan, Sept. 6, 1963, 38/46,695; Mar. 30, 1964 (utility model), 39/23,875
U.S. Cl. 156—228                       3 Claims
Int. Cl. B32b 31/04

ABSTRACT OF THE DISCLOSURE

A method for fabricating wear-resistant, sliding-surface materials which comprises: disposing a wire mesh sieve so that its lower surface is parallel to and at a selected distance from the working surface of a pressure applying flat plate, distributing through the sieve mesh and into the space so formed between said two surfaces a starting material powder of polytetrafluoroethylene resin and of the order of 35% powder material selected from the group consisting of graphite, molybdenum, lead, cadmium, molybdenum disulfide, glass, and mixtures thereof until said space is uniformly filled; removing the sieve to leave a uniformly distributed powder layer; pressure bonding the said powder layer so formed to a sheet of mesh fabric to form an integral laminated material; and heating said integral laminated material to cause sintering thereof.

---

This invention relates to a method of making wear-resistant, sliding-surface materials such as bearing surface material in substantially thin laminate sheet form composed principally of synthetic resin, particularly polytetrafluoroethylene, and reinforced with mesh fabric, particularly metal wire mesh.

For the principal starting material, the present invention contemplates the use of polytetrafluoroethylene (hereinafter referred to simply as PTFE) powder or PTFE powder into which an appropriate quantity of at least one inorganic filler such as graphite, molybdenum, lead, cadmium, molybdenum disulfide, and glass in powder form has been added. These powders hereinafter are referred to collectively as "starting material powder having PTFE as a principal constituent" or simply as "starting material powder."

Heretofore, thin sheets of PTFE have been manufactured, in general, by pressure forming PTFE powder, sintering the formed product, and then cutting or slicing sheets from the round bar so obtained. However, in the case where inorganic fillers are admixed with the product, the cutting edge for slicing the round bar is subject to much wear and damage. Furthermore, the slicing of sheets of uniform thickness of 0.5±0.03 mm. or less has been considered to be impossible.

Under these circumstances, of course, it is doubtful whether the production of a thin sliding-surface material made of a synthetic resin and containing a metal wire mesh for the purposes of increasing mechanical strength and increasing heat conduction of the material has even been considered.

According to one prior art process for producing oilless bearings, by interposing a synthetic resin in powder form or sheet form between two sheets of wire mesh and heating under pressure the laminated structure so obtained, a thin-film layer of synthetic resin is formed on the outer sides of the wire mesh. This method is infeasible in the case of its application to PTFE, particularly to PTFE containing an inorganic filler, since it is not possible to cause the resin to overflow through the wire mesh and form a layer on the reverse side, even in the case of pure PTFE resin.

The reason for this difficulty is that PTFE lacks fluidity even when it is heated to a temperature above its melting point (327 deg. C.). The above reference relates to the case where two sheets of wire mesh are used, but the infeasibility of application of the method with respect to PTFE is the same also in the case where one sheet of wire mesh is used. That is, when a starting material powder or sheet having PTFE as its principal constituent is held firmly against one side of a wire mesh and heated under pressure at a temperature above the melting point of the starting material, a layer of the PTFE is not formed on the reverse side of the wire mesh. Furthermore, when two sheets of PTFE are pressed against opposite sides of a wire mesh and heated to the melting point to cause sintering, the PTFE films so formed easily peel off, and the desired laminate material cannot be obtained.

Another difficulty encountered in the use of PTFE is that, to the present date, no suitable adhesive therefor has been found. Accordingly, in the case of thin sliding-surface materials of the type with which this invention is concerned, the last-mentioned difficulty presents a problem since, in many practical applications of such materials, they must be supported firmly by a backing structure.

In view of the difficulties as above described, it is a general object of the present invention to overcome these difficulties and to provide a method for producing a thin sliding-surface material composed principally of PTFE and provided internally with wire mesh, which has excellent properties including high thermal conductivity, high resistance to wear, and capability of withstanding high-speed sliding operation under light loads.

It is another object to provide a method for producing the thin sliding-surface material of the above described character from a starting material in a form such as powder consisting of PTFE powder or PTFE powder in which a suitable quantity of at least one inorganic filler such as graphite, molybdenum, and lead has been admixed.

It is still another object to provide a method for producing a PTFE sliding-surface structure including a sufficiently strong backing member.

It is a further object to provide a method for producing a structure of the above stated character which is a PTFE sliding surface of curved form such as a spherical form.

The specific nature, principle, and details of the invention will be best understood by reference to the following detailed descripion when taken in conjunction with the accompanying drawings in which like parts are designated by like reference characters, and in which:

FIGS. 1, 2, and 4 respectively consist of plan views (a) and sectional elevational views (b) showing progressive steps in one example process embodying the invention;

In the development of the present invention, we have found that a thin material of PTFE containing therein a wire mesh can be produced by first causing a starting material powder having PTFE as its principal constituent to adhere under pressure, in its powder form, to one side of a wire mesh, causing another batch of the powder to adhere separately under pressure on the opposite side of the wire mesh, and sintering the wire mesh and pressure-bonded powder assembly so formed.

Considerable care must be exercised in distributively laying the thin layers of starting material powder to be pressure bonded to the wire mesh. Unless these layers are formed with uniform density and thickness, satisfactory products having thicknesses of 0.5±0.03 mm. or less cannot be produced. That is, it is extremely difficult to spread a layer of powder of the thinness and uniformity as required by the method of the present invention on a planar metal plate to be used for applying pressure. For example, if the starting material powder is placed in a flat-bottomed die, and the surplus powder is scraped off by means of a straight edge, according to ordinary practice, numerous streaks of furrows and ridges will be left on the surface of the spread powder, or the powder will be swept unevenly to leave exposed parts of the die bottom, and the desired uniform distribution cannot be attained. This unsatisfactory result is caused by the small depth of the die and the characteristic of the PTFE powder.

By the practice of the present invention, the lower surface of a sieve is disposed parallel to and at a selected distance from the upper surface of a flat plate to be used for applying pressure, and the space between the two surfaces is filled uniformly with the starting material powder through the mesh of the sieve. The sieve is then removed, and the wire mesh to be incorporated in the product is placed on the resulting layer of starting material powder, whereby a layer of starting material powder of uniform thickness in contact with the wire mesh is obtained.

In order to indicate more fully the nature of the invention, the following examples of typical procedure embodying the invention are set forth, it being understood that these examples are presented as illustrative only, and that it is not intended to limit the scope of the invention.

Figure 1A:
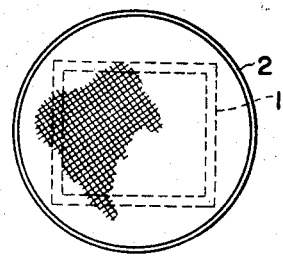
Figure 1B:
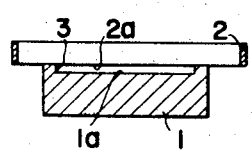

Referring to FIG. 1, a 35-mesh sieve 2 is placed on a flat-bottomed die 1 for pressure application in a manner such that the lower surface 2a of the sieve parallelly faces the upper surface 1a of the die, and a space 3 of 0.5-mm. depth is maintained between the two surfaces 1a and 2a.

Figure 2A:
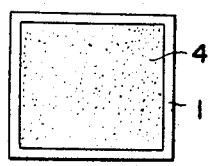
Figure 2B:
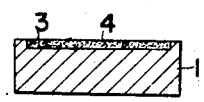

Next, PTFE-graphite powder (containing approximately 35 percent of graphite powder passing through a 120-mesh sieve) passing through a 40-mesh sieve is placed, a small quantity thereof at a time, onto the 35-mesh sieve 2 and shifted over the sieve screen with a brush until the particles fall through the mesh, and the 0.5-mm. space 3 is uniformly filled. The sieve 2 is then removed, whereupon a PTFE-graphite powder layer 4 of 0.5-mm. thickness as shown in FIG. 2 is obtained.

Figure 3:
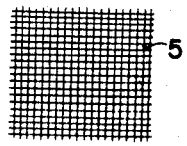
FIG. 3 is a planar view showing a wire mesh suitable for use according to the invention.
Figure 4A:
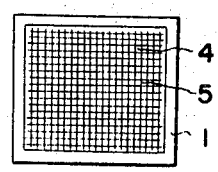
Figure 5:
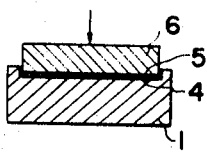
FIG. 5 is an elevational view in vertical section showing the process step wherein a male press die is operating.
Figure 4B:
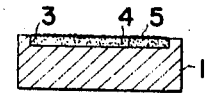

Next, a 40-mesh wire mesh 5, as shown in FIG. 3, made of 0.18-mm. diameter Phosphor bronze wire is placed on the powder layer 4 as shown in FIG. 4, and a pressure (300 kg./cm.²) is applied thereon by means of a male press die 6 as indicated in FIG. 5. As a result, a single-resin-layer wire mesh 7 having a pressure bonded layer of PTFE-graphite powder on its one side is obtained, as shown in enlarged scale in FIG. 6, in which the region 4a is the resin layer of compressed PTFE-graphite powder. The single-resin-layer wire mesh 7 is removed from the die 1.

Figure 7:
FIG. 7 is a similar view showing a thin sliding-surface material of the invention with PTFE layers bonded to both sides of a wire mesh.

In the case of obtaining a double-resin-layer wire mesh, the following procedure is adopted. That is, in the same manner as the case of single-resin-layer wire mesh, another uniform layer of PTFE-graphite powder is laid on the die surface 1a. The previously formed single-resin-layer wire mesh 7 is then placed in inverted state on this powder layer, and a pressure is applied in the same manner as above described, whereupon a wire mesh having resin layers on its both sides as indicated in enlarged scale in FIG. 7 is obtanied.

The pressed material so obtained is then sintered at proximately 400 deg. C., whereupon a thin-film sliding surface material of synthetic resin with integrally incorporated wire mesh, which has a thickness of 0.45±0.03 mm. is obtained.

In the foregoing example, powder passing through a 40-mesh sieve was laid by means of a 35-mesh sieve because of considerations of the nature of the starting material powder and of the degree of its passage through the sieve.

The thin-film sliding-surface material of single-or-double-resin layer wire mesh type which is produced in the above described manner according to the invention may be used in practical application as a single sheet or as an assembly of a plurality of sheets in loose laminar arrangement between two sliding surfaces. For example, by using several sheets of this material in a loosely fitting arrangement between a rotating shaft and its bearing, the relative rotational speed between each pair of sliding surfaces is reduced, whereby the material functions with high effectiveness as a loose-fit bushing material for light-load, high-speed rotation.

In some applications, it may be preferable to use the single-resin-layer wire mesh type sliding-surface material of this invention in a supported state as a part of a sliding-surface structure according to the invention in another aspect thereof, as described hereinbelow.

Figure 11A:
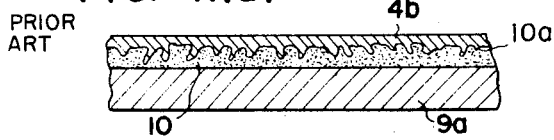
FIGS. 11(a) and 11(b) are fragmentary, sectional views showing examples of sliding-surface structures according to the prior art.
Figure 11B:
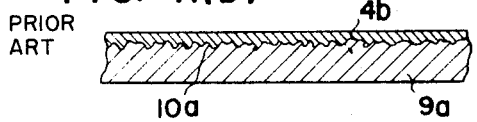

Because a suitable adhesive for PTFE has yet to be discovered, as mentioned hereinbefore, the prior art has resorted to special fabrication methods as illustrated in FIGS. 11(a) and 11(b) in order to secure PTFE sliding-surface material to a holding (or backing) structure. More specifically, on the surface of a sintered alloy metal 10 adhered to a holding structure 9a as indicated in FIG. 11(a), or on the surface of holding structure 9a as indicated in FIG. 11(b), a large number of small, irregular crenulations 10a are formed by a physical or chemical treatment. Then, in either case, a PTFE layer 4$_b$ is deposited on the resulting irregular surface in a manner to cause a portion of the PTFE layer to penetrate intimately into the irregularies of the sintered alloy surface or the crenulated surface of the holding structure, thereby to anchor the PTFE layer 4$_b$ to the holding structure. According to the prior art, no better method of securing the PTFE layer has been devised as far as we are aware.

Figure 6:
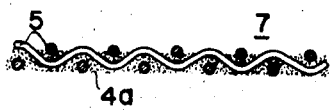
FIG. 6 is an enlarged, fragmentary view, in section, showing a thin sliding-surface material according to the invention with a PTFE layer bonded to only one side of a wire mesh.

According to the present invention, however, it has become possible to secure the PTFE layer 4 with high tenacity to the holding structure without providing a specially treated surface on the holding structure as above described. According to the present invention, said possibility has been easily obtained by adhering wire mesh side of a single-resin-layer wire mesh such as illustrated in FIG. 6 onto the surface of a holding structure by means of a metal adhesive 8, whereby a wear-resistant sliding-surface structure having a PTFE layer of an overall construction of great strength is obtained. Illustrations of this structure are shown in FIGS. 8, 9, and 10.

Figure 8:
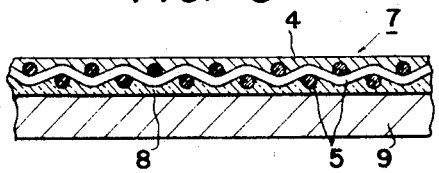
FIG. 8 is an enlarged, fragmentary view, in section, showing a sliding-surface structure of planar form embodying the invention.

In the illustration of FIG. 8, a single-resin-layer wire mesh 7 consisting of a PTFE layer 4 and a wire mesh 5 bonded thereto is bonded at its wire mesh side to a holding structure 9 (backing metal) by a metal adhesive 8.

Figure 9:
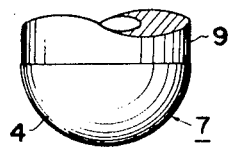
FIG. 9 is a side view, with a part cut off, showing a sliding-surface structure of spherical form embodying the invention.
Figure 10:
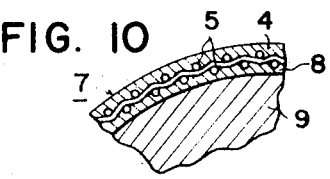
FIG. 10 is an enlarged, fragmentary view showing one part of the structure shown in FIG. 9.

In the illustration of FIGS. 9 and 10, a spherically formed single-resin-layer wire mesh 7 consisting of a PTFE layer 4 and a wire mesh 5 bonded thereto is bonded at its wire mesh side to spherical surface of a holding structure 9 by a metal adhesive 8, whereby a wear-resistant spherical sliding-surface structure is easily obtained.

In order to fabricate such a sliding-surface material of a convex or concave spherical shape, a wire mesh provided on one surface thereof with an unguent material layer having PTFE as its principal constituent is pressed in the manner of deep drawing, with the use of a wrinkle removing technique, by means of a pair of spherical surface male and female dies in accordance with the method set forth hereinbefore. As a result, a concave or convex spherical surface of unguent material layer on one surface of a wire mesh functioning as a reinforcement is obtained.

In this case, the unguent material bonded onto the wire mesh surface may be sintered while it is still in the form of a flat sheet and then press formed, or it may be sintered after it has been press formed.

When unguent material layer of spherical surface with wire mesh reinforcement obtained in this manner is mounted on a backing metal, which has been prepared beforehand in accordance with the concavity or convexity of the exposed wire mesh surface, and the exposed wire mesh surface is bonded by means of an adhesive onto the concave or convex spherical surface of the backing metal, the desired sliding-surface structure is obtained.

According to this invention, as illustrated in FIGS. 9 and 10, a wear resistant sliding-surface structure with a PTFE surface of spherical shape, which heretofore could not be attained, is obtained in an easy manner.

In one instance of practical application, a PTFE layer containing 30 percent of lead powder was secured according to the method of this invention as aforedescribed to one side of a 50-mesh wire mesh made of Phosphor bronze wire of 0.18-mm. diameter, and wire mesh side thereof was then bonded to a backing structure with a metal adhesive having an epoxy resin as its principal constituent. As a result, an excellent sliding-surface structure was obtained.

The metal adhesive to be used in the practice of the invention is not limited to those containing epoxy resins, it being possible to use a metallic solder having a lower melting point than the PTFE.

We claim:
1. A method for fabricating wear-resistant, sliding-surface materials, which comprises: disposing a wire mesh sieve on a flat-bottomed die for pressure application so that its surface is parallel to and at a distance of about 0.50 mm. from the upper working surface of said die; distributing through the sieve mesh and into the space formed between said two surfaces a starting material powder comprising, as its main material, polytetrafluorethylene resin powder and of the order of 35% of an inorganic filler powder material selected from the group consisting of graphite, molybdenum, lead, cadmium, molybdenum disulfide, glass and mixtures thereof, until said space is completely filled with said material powder so as to form a filled powder layer having a thickness of about 0.50 mm.; removing said sieve to leave said filled powder layer; placing a metal wire mesh in contact with the upper surface of said layer; applying pressure on said metal wire mesh by means of a male press die, said pressure being adapted to obtain a pressure bonded layer consisting of said starting material powder and metal wire mesh; and subjecting the said pressure bonded layer to sintering to obtain a thin-film sliding-surface material composed of the synthetic resin and inorganic filler with an integrally incorporated metal wire mesh.

2. A method for manufacturing a wear-resistant, sliding-surface structure, which comprises: disposing a wire mesh sieve on a flat-bottomed die for pressure application so that its surface is parallel to and at a distance of about 0.50 mm. from the upper working surface of said die; distributing through the sieve mesh and into the space formed between said two surfaces a starting material powder comprising, as its main material, polytetrafluoroethylene resin powder and of the order of 35% of an inorganic filler powder material selected from the group consisting of graphite, molybdenum, lead, cadmium, molybdenum disulfide, glass and mixtures thereof, until said space is completely filled with said material powder so as to form a filled powder layer having a thickness of about 0.50 mm.; removing said sieve to leave said filled powder layer; placing a metal wire mesh in contact with the upper surface of said layer; applying pressure on said metal wire mesh by means of a male press die, said pressure being adapted to obtain a pressure bonded layer consisting of said starting material powder and metal wire mesh; and subjecting said pressure bonded layer to sintering to obtain a thin-film sliding surface material composed of the synthetic resin and inorganic filler with an integrally incorporated and exposed metal wire mesh; and bonding said thin-film sliding-surface material at its metal wire mesh side to the sliding surface of a holding structure by means of a metal adhesive.

3. A method according to claim 2, in which a holding structure having a convex, concave holding surface is used and said thin-film sliding-surface material is subjected to pressing according to deep drawing by means of a pair of curved surface male and female dies corresponding to the curvature of said holding surface.

References Cited
UNITED STATES PATENTS

| | | | |
|---|---|---|---|
| Re. 26,234 | 7/1967 | Lightfoot | 264—127 |
| 2,400,091 | 5/1946 | Alfthan. | |
| 2,673,370 | 3/1954 | Goss | 264—126 X |
| 2,728,698 | 12/1955 | Rudner. | |
| 2,798,005 | 7/1957 | Love. | |
| 2,809,130 | 10/1957 | Rappaport. | |
| 3,059,318 | 10/1962 | Herbert et al. | |
| 3,158,526 | 11/1964 | Farnam et al. | 161—95 |

ROBERT F. BURNETT, *Primary Examiner.*

ROGER H. CRISS, *Assistant Examiner.*

U.S. Cl. X.R.

156—245; 161—89, 95, 189; 264—127